United States Patent
Hashimoto et al.

(10) Patent No.: US 8,740,291 B2
(45) Date of Patent: Jun. 3, 2014

(54) HOOD INNER PANEL

(75) Inventors: Shu Hashimoto, Inagi (JP); Masatoshi Yoshida, Kobe (JP)

(73) Assignees: Nissan Motor Co., Ltd., Yokohama-shi (JP); Kabushiki Kaisha Kobe Seiko Sho, Kobe-shi (JP)

( * ) Notice: Subject to any disclaimer, the term of this patent is extended or adjusted under 35 U.S.C. 154(b) by 0 days.

(21) Appl. No.: 13/823,059

(22) PCT Filed: Nov. 28, 2011

(86) PCT No.: PCT/JP2011/077334
§ 371 (c)(1),
(2), (4) Date: Mar. 13, 2013

(87) PCT Pub. No.: WO2012/073870
PCT Pub. Date: Jun. 7, 2012

(65) Prior Publication Data
US 2013/0175827 A1    Jul. 11, 2013

(30) Foreign Application Priority Data
Dec. 3, 2010   (JP) ................. 2010-270390

(51) Int. Cl.
*B62D 25/10* (2006.01)

(52) U.S. Cl.
CPC .................. *B62D 25/105* (2013.01)
USPC ............. 296/193.11; 296/187.04; 180/69

(58) Field of Classification Search
USPC ............. 296/193.11, 187.04; 180/69.1, 69.21
See application file for complete search history.

(56) References Cited

U.S. PATENT DOCUMENTS

| | | | |
|---|---|---|---|
| 6,846,038 B1 * | 1/2005 | White et al. | 296/193.11 |
| 6,883,627 B1 | 4/2005 | Staines et al. | |
| 7,150,496 B2 | 12/2006 | Fujimoto | |
| 7,467,680 B2 * | 12/2008 | Mason | 180/69.2 |
| 7,488,031 B2 | 2/2009 | Ishitobi | |
| 8,052,198 B2 * | 11/2011 | Seksaria et al. | 296/187.04 |
| 8,075,048 B2 | 12/2011 | Kimoto et al. | |
| 2008/0007094 A1 | 1/2008 | Ishitobi | |
| 2009/0195031 A1 * | 8/2009 | Ishitobi | 296/193.11 |

FOREIGN PATENT DOCUMENTS

| | | |
|---|---|---|
| JP | 2001-151159 A | 6/2001 |
| JP | 2003-205866 A | 7/2003 |
| JP | 2004-359114 A | 12/2004 |
| JP | 2006-044311 A | 2/2006 |
| JP | 2006-281926 A | 10/2006 |
| JP | 2008-030574 A | 2/2008 |
| JP | 2008-302749 A | 12/2008 |
| WO | WO 2006/025315 A1 | 3/2006 |

* cited by examiner

*Primary Examiner* — Glenn Dayoan
*Assistant Examiner* — Pinel Romain
(74) *Attorney, Agent, or Firm* — Foley & Lardner LLP (57) ABSTRACT

A hood inner panel (5) includes an inner panel main body (5a) forming part of a hood (1) of a vehicle, a front bead (7) provided on the inner panel main body (5a) and extending along a vehicle width direction, and a rear bead (9) provided on the inner panel main body (5a), located on the rear side of the front bead (7) toward a back of the vehicle and extending along the vehicle width direction. The front bead (7) is curved toward the front of the vehicle such that a center portion (7a) in the vehicle width direction is located in front of each end portion (7b) in the vehicle width direction, and the rear bead (9) is curved toward the back of the vehicle such that a center portion (9a) in the vehicle width direction is located behind each end portion (9b) in the vehicle width direction.

5 Claims, 6 Drawing Sheets

HOOD INNER PANEL

TECHNICAL FIELD

The present invention relates to a hood inner panel forming part of a hood of a vehicle.

BACKGROUND ART

Patent Document 1 describes an inner panel of a hood for a vehicle provided with a plurality of beads extending in a vehicle width direction to enhance an energy absorption capacity at the time of impact.

CITATION LIST

Patent Literature

Patent Document 1: Japanese Patent Unexamined Publication No. 2008-030574

SUMMARY OF INVENTION

The hood described above is required to have a high initial reaction force against the impact exerted on the hood in order to enhance the energy absorption capacity. The hood is further required to minimize a reduction of a reaction force by deformation in collision.

It is an object of the present invention to provide a hood inner panel capable of minis mg a reduction of a reaction force of the hood inner panel even if a level of deformation of a hood of a vehicle increases, and ensuring a sufficient energy absorption capacity.

A hood inner panel according to the present invention includes an inner panel main body forming part of a hood of a vehicle, a front bead provided on the inner panel main body and extending along a vehicle width direction, and a rear bead provided on the inner panel main body, located on a rear side of the front bead and extending along the vehicle width direction. The front bead includes a center portion in the vehicle width direction that is curved toward a front of the vehicle and located in front of each end portion in the vehicle width direction, and the rear bead includes a center portion in the vehicle width direction that is curved toward a back of the vehicle and located behind each end portion in the vehicle width direction.

BRIEF DESCRIPTION OF DRAWINGS

[FIG. 1] FIG. 1(*a*) is a plan view of a hood inner panel of a hood for a vehicle according to a first embodiment of the present invention. FIG. 1(*b*) is a cross-sectional view taken along the line A-A in FIG. 1(*a*).

[FIG. 2] FIG.2(*a*) to 2(*c*) are plan views explaining actions of impact by an object exerted on the upper surface of the hood in FIG. 1(*b*). FIG. 2(*a*) is a plan view showing directions in which impact loads are transmitted in beads. FIG. 2(*b*) is a cross-sectional view showing moments caused in center portions in a vehicle width direction of the beads on the hood taken along the line B-B in FIG. 2(*a*). FIG. 2(*c*) a cross-sectional view showing moments caused in side portions in the vehicle width direction of the beads on the hood taken along the line C-C in FIG. 2(*a*)

[FIG. 3]

[FIG. 4]

[FIG. 5] FIG. 5(*a*) is a plan view of a hood inner panel of a hood for a vehicle according to a second embodiment of the present invention. FIG. 5(*b*) is a cross-sectional view taken along the line D-D in FIG. 5(*a*).

[FIG. 6]

DESCRIPTION OF EMBODIMENTS

Hereinafter, embodiments of the present invention will be explained in detail with reference to the drawings.

[First Embodiment]

Figure 1:
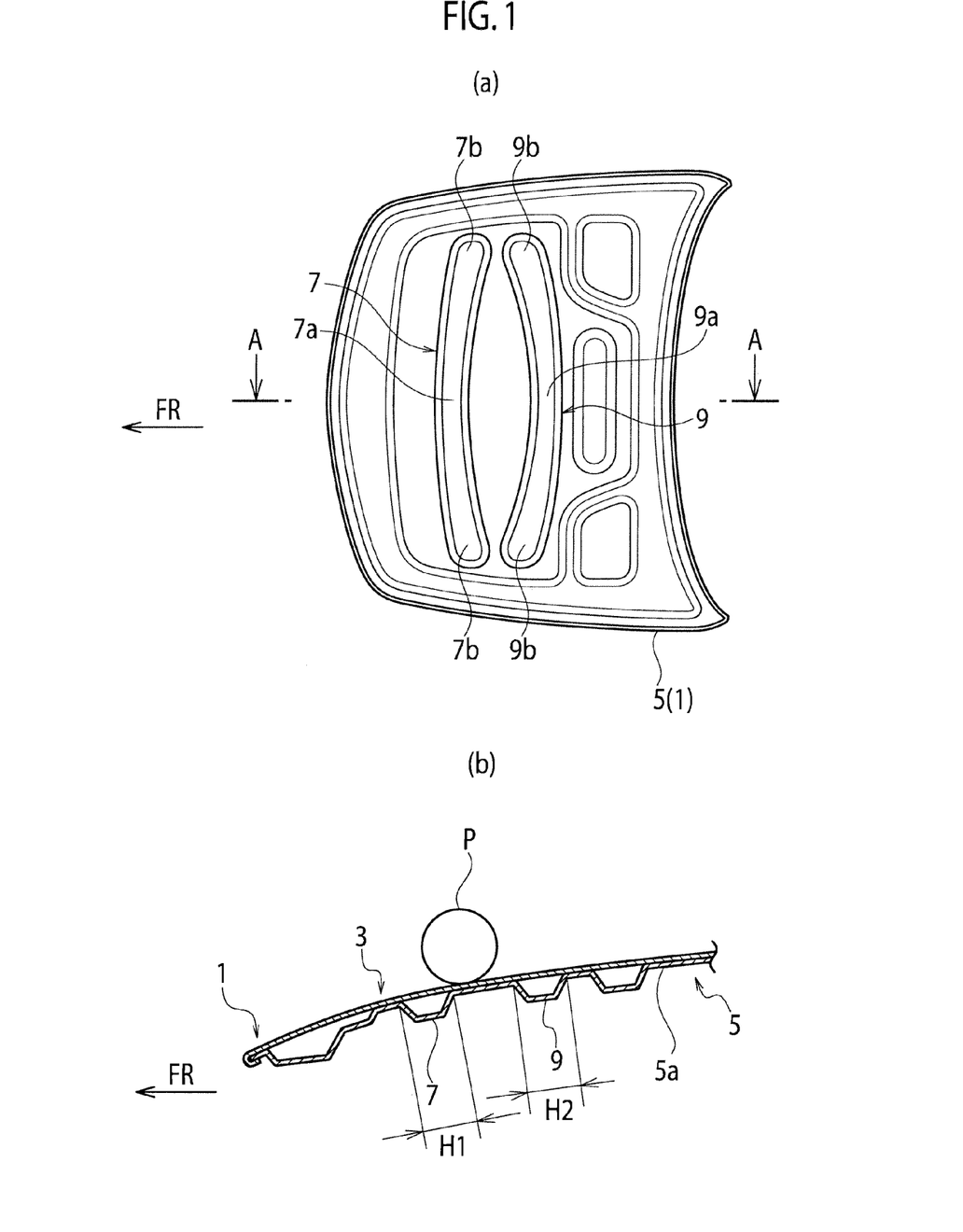

As shown in FIG. 1, a hood 1 for a vehicle includes a hood outer panel 3 located on the outer side of a vehicle body, and a hood inner panel 5 fixed to the inner surface of the hood outer panel 3 inside the vehicle body. The hood inner panel 5 includes an inner panel main body 5*a* provided with a front bead 7 and a rear bead 9 extending in a vehicle width direction. Each center in the vehicle width direction of the front bead 7 and the rear bead 9 is substantially coincident with the center in the vehicle width direction of the hood inner panel 5 (the hood 1). Note that the direction indicated by the arrow FR in FIG. 1 is the front side of the vehicle, and the vertical direction in FIG. 1(*a*) is the vehicle width direction.

As shown in FIG. 1(*b*), the front bead 7 and the rear bead 9 are projections projecting to the inside of the vehicle in the direction away from the hood outer panel 3.

The front bead 7 is provided on the hood inner panel 5 toward the front of the vehicle. The front bead 7 includes a center portion 7*a* that is curved toward the front of the vehicle and located in front of end portions 7*b* on both sides in the vehicle width direction. The front bead 7 projects to the inside of the vehicle, and the projection is tapered toward the tip. As shown in FIG. 1(*b*), the projection has a width H1 at the base portion, which is defined as a width of the front bead 7. The width H1 of the front bead 7 in the front-back direction of the vehicle is gradually increased from the center portion 7*a* toward the end portions 7*b* on both sides in the vehicle width direction.

The rear bead 9 is located on the rear side of the front bead 7. The rear bead 9 includes a center portion 9*a* that is curved toward the back of the vehicle and located behind end portions 9*b* on both sides in the vehicle width direction. The rear bead 9 also has a width H2 in the front-back direction of the vehicle that is gradually increased from the center portion 9*a* toward the end portions 9*b* on both sides in the vehicle width direction. The width H2 at the base portion of the projection is defined as a width of the rear bead 9 in the front-back direction as in the case of the front bead 7.

As shown in FIG. 1(*a*), the center portion 7*a* of the front bead 7 is curved toward the front of the vehicle, while the center portion 9*a* of the rear bead 9 is curved toward the back of the vehicle. Namely, the respective front and rear beads 7 and 9 are curved in opposite directions. Thus, the gap between the center portion 7*a* of the front bead 7 and the center portion 9*a* of the rear bead 9 is larger than the gap between each end portion 7*b* of the front bead 7 and each end portion 9*b* of the rear bead 9.

The following is an explanation of a state in which the hood 1 including the hood inner panel 5 having the structure described above is hit, especially on the center portions of the front and rear beads 7 and 9 provided on the hood inner panel 5, with an external object P as shown in FIG. 1(*b*).

Figure 2:
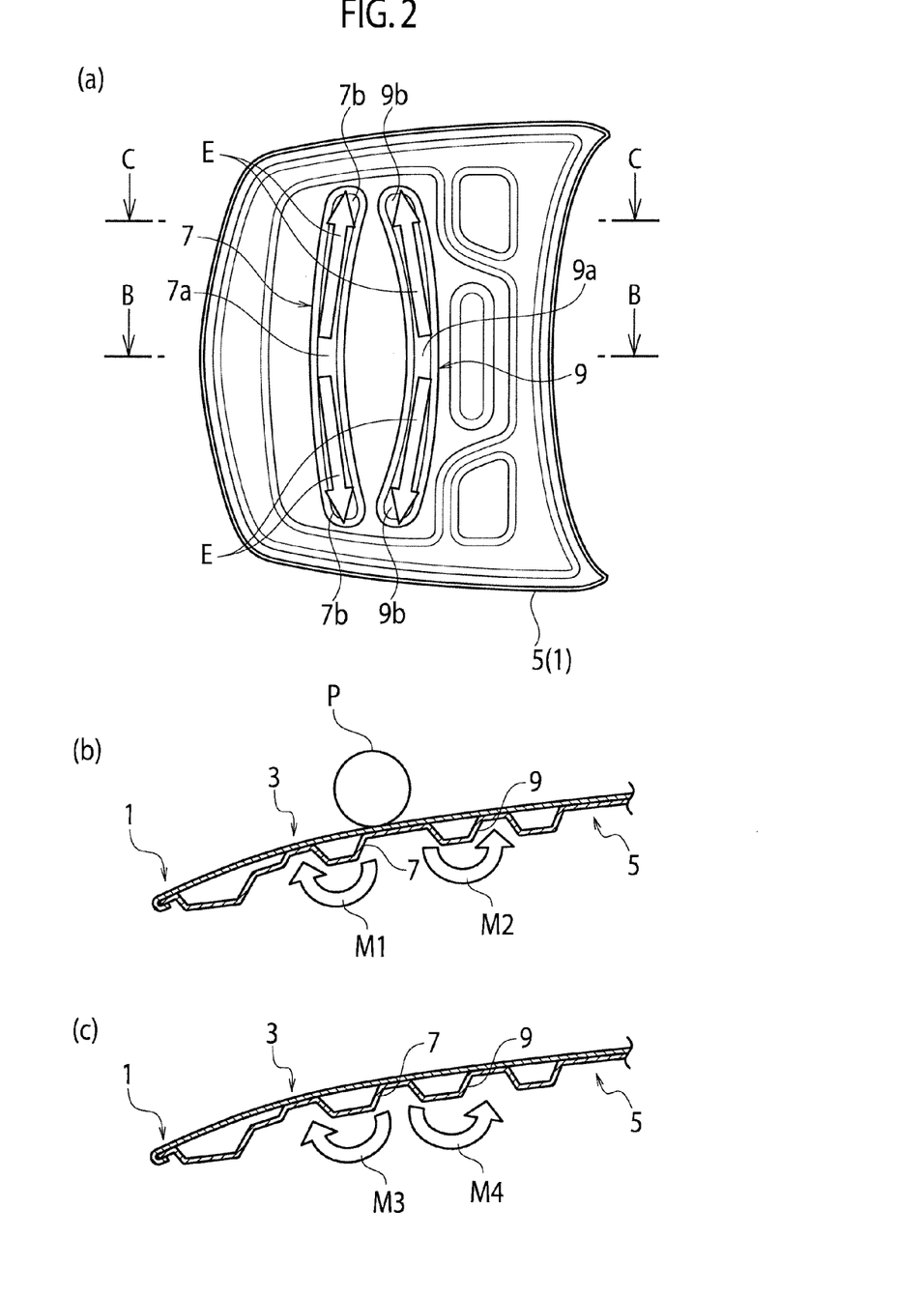

An impact load applied to the hood inner panel 5 is gradually transmitted in directions from the center portions 7*a* and 9*a* toward the respective end portions 7*b* and 9*b* on both sides in the front and rear beads 7 and 9 as indicated by the arrows E in FIG. 2(*a*). In the present embodiment, the respective front and rear beads 5 and 9 are curved in opposite directions. Therefore, as shown in FIG. 2(*b*), moments M1 and M2 caused in the center portions 7*a* and 9*a* around the cross-section of each projection are transmitted in opposite directions. The moments M1 and M2 caused in the center portions 7*a* and 9*a* are gradually transmitted to both sides in the vehicle width direction as shown in FIG. 2(*b*). The moments M1 and M2 reach the respective end portions 7*b* and 9*b* on both sides in the vehicle width direction and finally change to moments M3 and M4 shown in FIG. 2(*c*).

In the present embodiment, when the respective front and rear beads 7 and 9 are hit around the center portions 7*a* and 9*a* with the object P, the moments M1 and M2 in opposite directions are caused around the cross-section of each projection of the respective front and rear beads 7 and 9, and are finally transmitted to the respective end portions 7*b* and 9*b* on both sides in the vehicle width direction. As a result, even if a level of deformation of the hood 1 increases, a high reaction force can be kept relatively for a long period of time, and a reduction of the reaction force can be minimized, so that a sufficient energy absorption capacity can be ensured.

In the present embodiment, the front bead 7 and the rear bead 9 are curved to come closer to each other from the respective center portions 7*a* and 9*a* toward the respective end portions 7*b* and 9*b* on both sides. Therefore, the moments M1 and M2 around the cross-section of each projection shown in FIG. 2(*b*) are likely to be mutually offset gradually toward the respective end portions 7*b* and 9*b* on both sides in the vehicle width direction, and a level of vertical deformation caused by the impact load can be minimized As a result, deformation in the vertical direction of the vehicle in the respective end portions 7*b* and 9*b* on both sides of the respective front and rear beads 7 and 9 can be prevented. In addition, deformation in the vertical direction in the center portions 7*a* and 9*a* can also be prevented and accordingly, deformation in the vertical direction in the entire hood 1 can be prevented.

Figure 3:
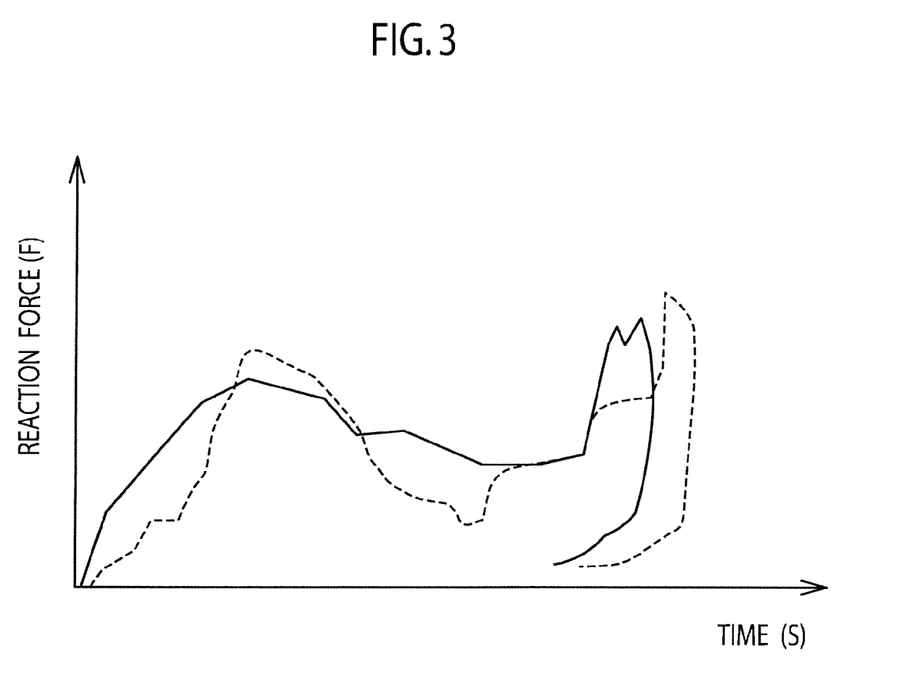
FIG.3 is an explanatory view showing a reaction force that varies with times after the impact by the object exerted on the upper surface of the hood. Note that the solid line in FIG. 3 represents the present embodiment, and the dashed line represents a conventional example in which beads extending in the vehicle width direction are not curved in contrast to the present embodiment.

Since deformation in the vertical direction of the vehicle in the center portions 7*a* and 9*a* can be prevented, an initial rise of the reaction force indicated by the solid line in FIG. 3 appears earlier than that in the conventional example indicated by the dashed line, and a peak reaction force can be kept longer than the conventional example. Therefore, the energy absorption property can be effectively exerted.

Due to the energy absorption effect, the gap between the hood 1 and contents located in the engine (motor) room below the hood 1 can be minimized. Therefore, it is possible to expand the possibility of design of the vehicle body and the engine (motor) room.

Figure 4:
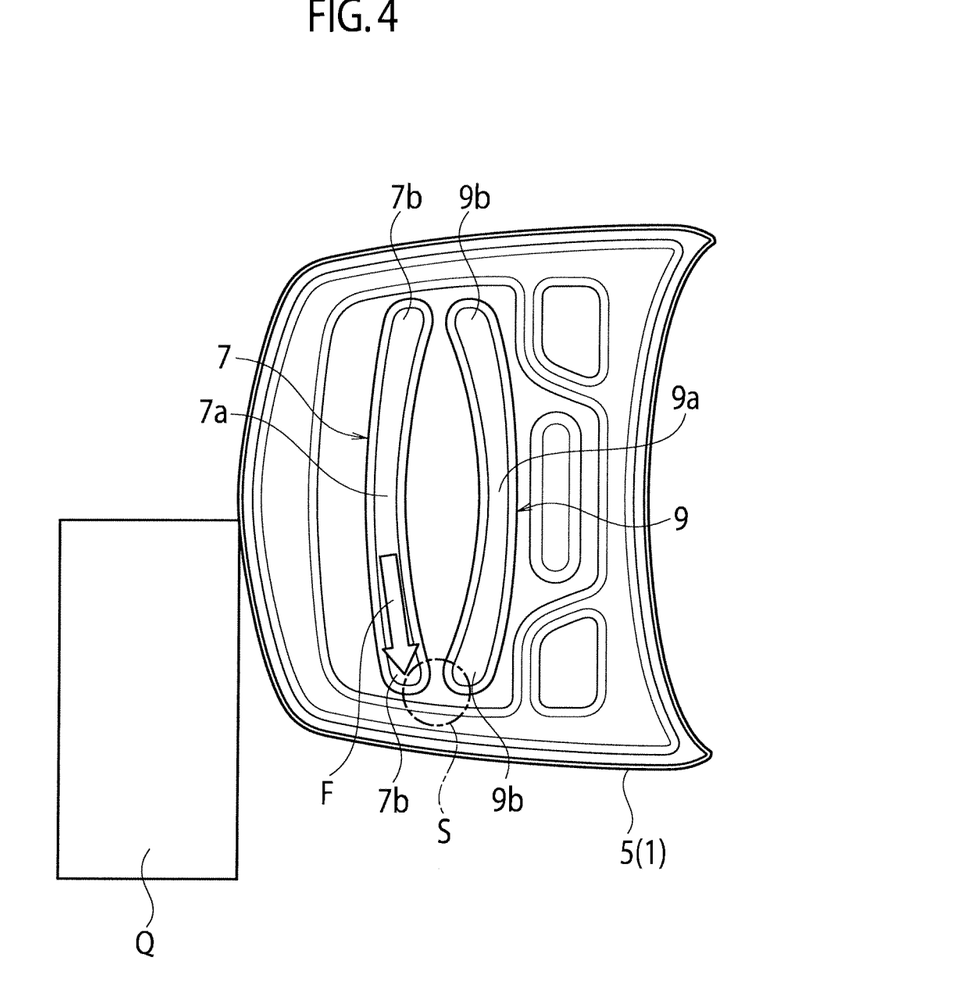
FIG. 4 is an explanatory view showing a flow of the impact load transmitted in the bead at the time of frontal impact of the vehicle.

As shown in FIG. 4, when the vehicle causes a head-on collision with an object Q, the impact load input by the collision reaches the end portion 7*b* on one side in the vehicle width direction from the center portion 7*a* of the front bead 7 as indicated by the arrow F. This input is likely to cause distortion in the region S between the end portion 7*b* on one side and the end portion 9*b* of the rear bead 9 on the same side and as a result, the entire hood 1 can be easily bent in the front-back direction of the vehicle. Accordingly, the level of deformation toward the outer surface can be minimized when the upper surface of the hood 1 is hit with the object P and at the same time, the impact absorption capacity can be improved due to the hood 1 that is easily bent by the head-on collision.

Although FIG. 4 exemplifies the case of the head-on collision with the object Q on one side in the vehicle width direction at the offset position from the center of the vehicle, the similar effect can be ensured also in the case of the head-on collision with the object Q at the center portion in the vehicle width direction. The impact load input by the collision at the center portion reaches the respective end portions 7*b* and 9*b* on both sides in the vehicle width direction from the center portions 7*a* and 9*a* of the respective front and rear beads 7 and 9. As a result, distortion is caused in both areas between the respective end portions 7*b* and 9*b* on both sides in the vehicle width direction.

In the present embodiment, at least one of the front bead 7 and the rear bead 9 increases in width in the front-back direction toward the end portions 7*b* or 9*b* on both sides from the front portion 7*a* or 9*a*. Such a configuration increases the rigidity of the end portions 7*b* and 9*b* on both sides more than the rigidity of the center portions 7*a* and 9*a*. Therefore, the level of deformation at the end portions 7*b* and 9*b* on both sides decreases and accordingly, deformation of the entire hood 1 can be minimized.

In particular, it is assumed that the moments caused by the input of the impact load particularly turn the center portions 7*a* and 9*a* of the respective front and rear beads 7 and 9 on the end portions 7*b* and 9*b* on both sides serving as supporting points. According to the present embodiment, such an input load can be effectively distributed in the hood 1 in the front-back direction of the vehicle.

In the first embodiment, the front bead 7 is formed in such a way that the width H1 in the front-back direction of the vehicle is gradually increased from the center portion 7*a* toward the end portions 7*b* on both sides. Alternatively, the width H1 may be substantially the same along the vehicle width direction instead of being changed. Similarly, the width H2 of the rear bead 9 in the front-back direction of the vehicle may be substantially the same along the vehicle width direction.

[Second Embodiment]

Next, a hood inner panel according to the second embodiment of the present invention is explained below with reference to the drawings. Note that the same components as in the first embodiment are indicated by the same reference numerals, and the explanations thereof are not repeated in this embodiment.

Figure 5:
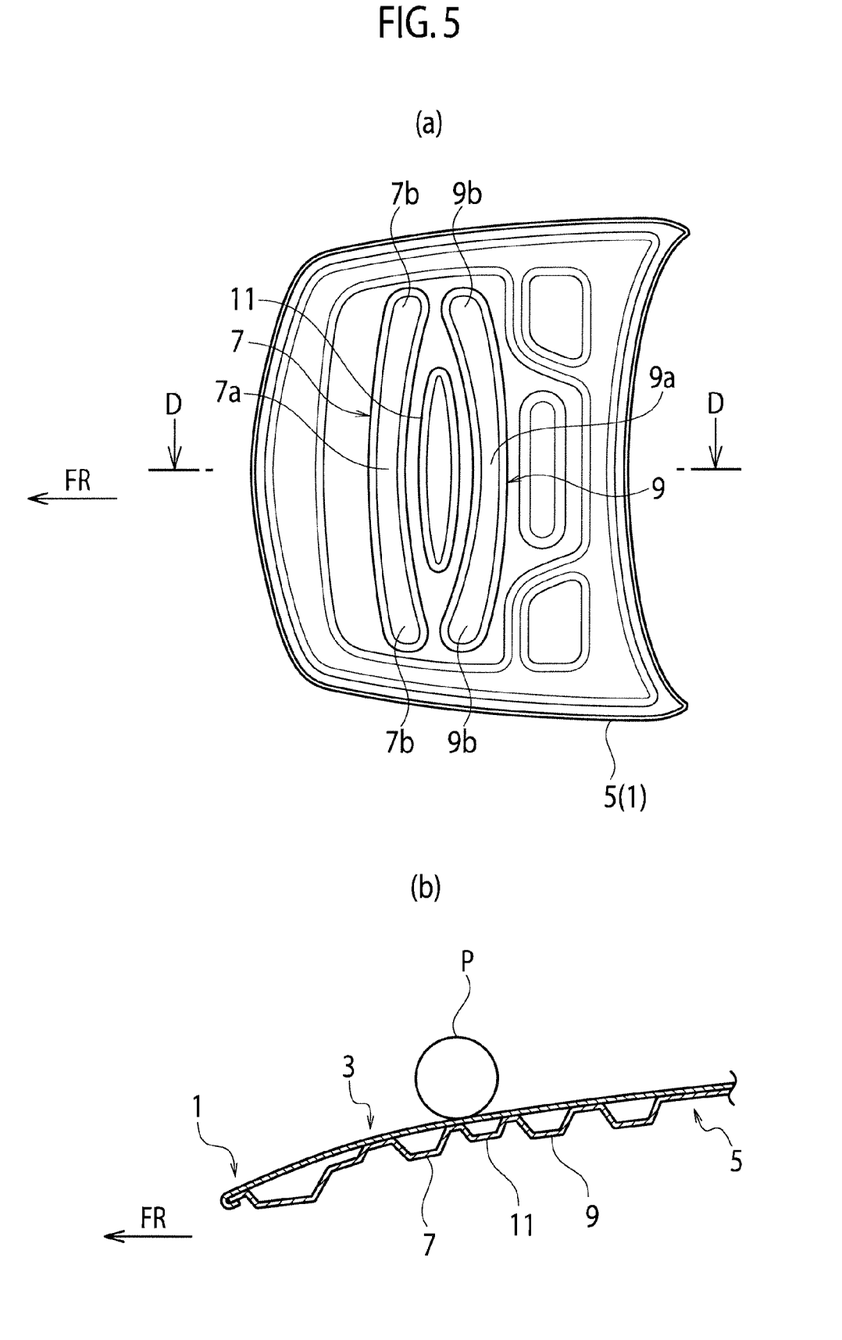

In the second embodiment, as shown in FIG. 5, an intermediate bead 11 is formed in an ellipsoidal shape extending in the vehicle width direction, and is provided between the front bead 7 and the rear bead 9 explained in the first embodiment. The intermediate bead 11 is located in the center of the hood inner panel 5 in the vehicle width direction. The center of the intermediate bead 11 in the vehicle width direction is substantially coincident with each center of the front bead 7 and the rear bead 9 in the vehicle width direction.

The hood inner panel 5 has regions between the intermediate bead 11 and each of the front bead 7 and the rear bead 9 where the hood inner panel 5 is attached to the hood outer panel 3. The radius of curvature of the curved portion in the intermediate bead 11 on the front bead 7 side may be identical to, or may be different from the radius of curvature of the curved portion in the front bead 7 on the intermediate bead 11 side. Similarly, the radius of curvature of the curved portion in the intermediate bead 11 on the rear bead 9 side may be identical to, or may be different from the radius of curvature of the curved portion in the rear bead 9 on the intermediate bead 11 side.

According to the present embodiment, the rigidity of the entire hood 1 can be increased due to the intermediate bead 11 provided between the front bead 7 and the rear bead 9. When the upper surface of the hood 1 is hit with the object P as shown in FIG. 5(b), the front bead 7 and the rear bead 9 are deformed and pushed toward the front and the rear of the vehicle, respectively, due to the intermediate bead 11. Therefore, the energy absorption effect in the entire hood 1 can be further improved. Accordingly, the gap between the hood 1 and contents located in the engine (motor) room below the hood 1 can be further minimized.

[Third Embodiment]

Next, a hood inner panel according to the third embodiment of the present invention is explained below with reference to the drawings. Note that the same components as in the first embodiment and the second embodiment are indicated by the same reference numerals, and the explanations thereof are not repeated in this embodiment.

Figure 6:
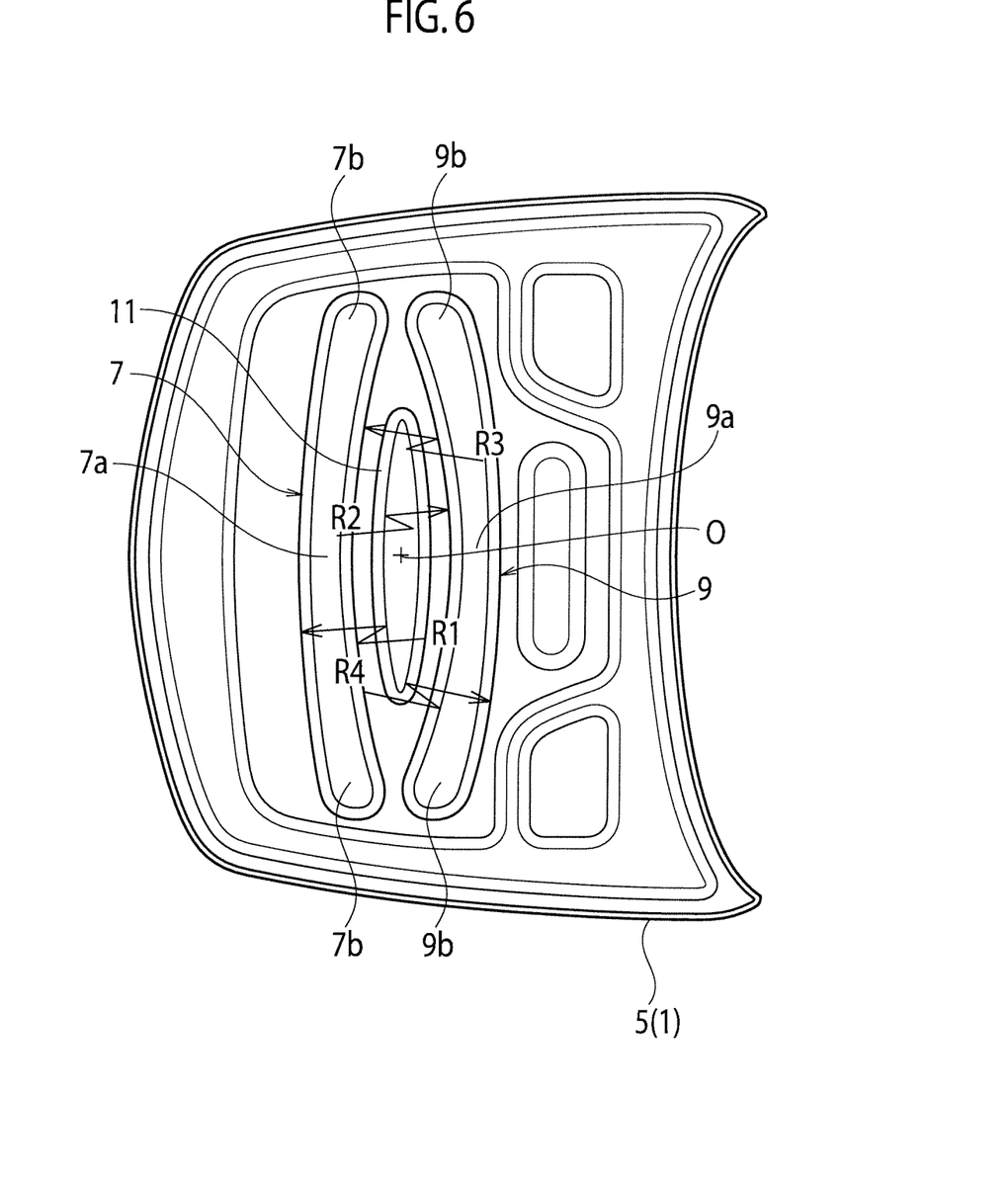
FIG. 6 is a plan view of a hood inner panel of a hood for a vehicle according to a third embodiment of the present invention.

In the third embodiment shown in FIG. 6, the front bead 7 is curved to have a radius of curvature R1 on the front side thereof and the rear bead 9 is curved to have a radius of curvature R2 on the front side thereof, and the radius of curvature R2 is smaller than the radius of curvature R1 (R1>R2), compared with those in the second embodiment shown in FIG. 5.

The curved portion on the rear side of the front bead 7 has a radius of curvature R3 that is set in such a manner as to fulfill the condition of R1>R3.

The curved portion on the rear side of the rear bead 9 has a radius of curvature R4 that is set in such a manner as to fulfill the condition of R4>R2. Namely, the radii of curvature of the respective curved portions in the front bead 7 and the rear bead 9 are set in such a manner as to fulfill the conditions of R1>R3 and R4>R2.

In addition, the radii of curvature R1 to R4 are set in such a manner as to fulfill the conditions of R1>R4 and R3>R2.

This configuration can ensure the same effects as in the first and the second embodiments. Further, the following effects can also be achieved in the present embodiment.

(1) When R1 is larger than R2 (R1>R2), the length of the curved shape of the rear bead 9 in the vehicle width direction is longer than that in the case in which R1 is equal to R2. The rear bead 9 is located closer to the center portion 0 of the hood 1. Therefore, the area occupied by the respective beads 7 and 9 in the hood 1 (the hood inner panel 5) in the front-back direction of the vehicle is increased, which contributes to the rigidity improvement accordingly.

(2) When RI is larger than R3 (R1>R3) and R4 is larger than R2 (R4>R2), each width in the front-back direction of the vehicle at the respective end portions 7b and 9b on both sides is greater than each width in the front-back direction of the vehicle at the respective center portions 7a and 9a in the respective front and rear beads 7 and 9, as in the case of the second embodiment shown in FIG. 1. This structure can improve the rigidity at the end portions 7b and 9b on both sides since the end portions 7b and 9b on both sides have larger areas in cross-section than the center portions 7a and 9a. As a result, the input of the impact load that causes the moments which acts so as to particularly turn the center portions 7a and 9a of the respective front and rear beads 7 and 9 on the end portions 7b and 9b on both sides serving as supporting points, can be effectively distributed in the hood 1 in the front-back direction of the vehicle. This effect can be ensured when at least one of the conditions of R1>R3 and R4>R2 is fulfilled. However, greater effects can be further achieved when the conditions of R1>R3 and R4>R2 are fulfilled concurrently.

(3) When R1 is larger than R4 (R1>R4) and R3 is larger than R2 (R3>R2), the rigidity of the rear bead 9 located closer to the center portion 0 of the hood 1 can be increased more reliably, which contributes to the rigidity improvement of the hood 1.

The entire content of Japanese Patent Application No. P2010-270390 (filed on Dec. 3, 2010) is herein incorporated by reference.

Although the present invention has been described above by reference to the embodiments, the present invention is not limited to the descriptions thereof, and it will be apparent to a person skilled in the art that various modifications and improvements can be made within the scope of the present invention. In particular, in the third embodiment, it is not required to provide the intermediate bead 11.

Industrial Applicability

According to the present invention, when the middle in the vehicle width direction of the front bead and the rear bead is hit with an object, moments in opposite directions are caused around the front bead and the rear bead curved in opposite directions, and the moments are then transmitted to the respective end portions on both sides in the vehicle width direction. Accordingly, even if a level of deformation of the hood increases, a reduction of the reaction force can be minimized and a sufficient energy absorption capacity can be ensured.

REFERENCE SIGNS LIST

1 Hood
3 Hood outer panel
5 Hood inner panel
5a Inner panel main body
7 Front bead
7a Center portion in vehicle width direction of front bead
7b Side end portion in vehicle width direction of front bead
9 Rear bead
9a Center portion in vehicle width direction of rear bead
9b Side end portion in vehicle width direction of rear bead
11 Intermediate bead
R1 Radius of curvature of curved portion on front side of front bead
R2 Radius of curvature of curved portion on front side of rear bead
R3 Radius of curvature of curved portion on back side of front bead

The invention claimed is:

1. A hood inner panel, comprising:
an inner panel main body forming part of a hood of a vehicle;
a front bead provided on the inner panel main body and extending along a vehicle width direction, the front bead having a center portion in the vehicle width direction and end portions in the vehicle width direction; and
a rear bead provided on the inner panel main body, located toward a rear side of the front bead and extending along the vehicle width direction, the rear bead having a center portion in the vehicle width direction and end portions in the vehicle width direction,
the front bead being curved toward a front of the vehicle such that the center portion of the front bead is located in front of each end portion, and the rear bead being curved toward a back of the vehicle such that the center portion of the rear bead is located behind each end portion, the front bead being an independent bead unconnected to beads other than the front bead, and the rear bead being an independent bead unconnected to beads other than the rear bead.

2. The hood inner panel according to claim 1, wherein an intermediate bead is provided between the front bead and the rear bead and extends in the vehicle width direction.

3. The hood inner panel according to claim 1, wherein at least one of the front bead and the rear bead has a width in a front-back direction of the vehicle at each end portion that is greater than a width in the front-back direction of the vehicle at the center portion.

4. The hood inner panel according to claim 1, wherein a radius of curvature R1 of a curved portion on a front side of the front bead and a radius of curvature R2 of a curved portion on a front side of the rear bead satisfy the following expression (1):

$$R1 > R2 \tag{1}.$$

5. The hood inner panel according to claim 1, wherein a radius of curvature R1 of a curved portion on a front side of the front bead and a radius of curvature R3 of a curved portion on a rear side of the front bead satisfy the following expression:

$$R1 > R3 \tag{2}.$$

* * * * *